(12) United States Patent
Wu et al.

(10) Patent No.: US 11,199,508 B1
(45) Date of Patent: Dec. 14, 2021

(54) FAILURE ANALYSIS METHOD WITH IMPROVED DETECTION ACCURACY FOR ADVANCED TECHNOLOGY NODE

(71) Applicant: TAIWAN SEMICONDUCTOR MANUFACTURING COMPANY LTD., Hsinchu (TW)

(72) Inventors: Chi-Che Wu, Hsinchu (TW); Tsung-Yang Hung, Hsinchu County (TW); Ming-Yih Wang, Hsin-Chu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/900,535

(22) Filed: Jun. 12, 2020

(51) Int. Cl.
*G01N 21/95* (2006.01)
*G06T 7/00* (2017.01)

(52) U.S. Cl.
CPC ....... *G01N 21/9501* (2013.01); *G06T 7/0004* (2013.01); *G06T 2207/30148* (2013.01)

(58) Field of Classification Search
CPC .............. G01N 21/9501; G06T 7/0004; G06T 2207/30148
See application file for complete search history.

(56) References Cited

U.S. PATENT DOCUMENTS

2019/0391079 A1* 12/2019 Kiss ................. H01L 22/12

* cited by examiner

*Primary Examiner* — Jamil Ahmed
(74) *Attorney, Agent, or Firm* — Wpat, P.C., Intellectual Property Attorneys; Anthony King

(57) ABSTRACT

A method includes: determining a defective area in a semiconductor device of a semiconductor wafer; thinning the semiconductor wafer from a backside of the semiconductor wafer; bonding a first substrate to the backside of the semiconductor wafer, wherein the first substrate includes an opening and the defective area is exposed through the opening; and performing a test on the defective area by projecting a light beam from the backside through the opening.

20 Claims, 17 Drawing Sheets

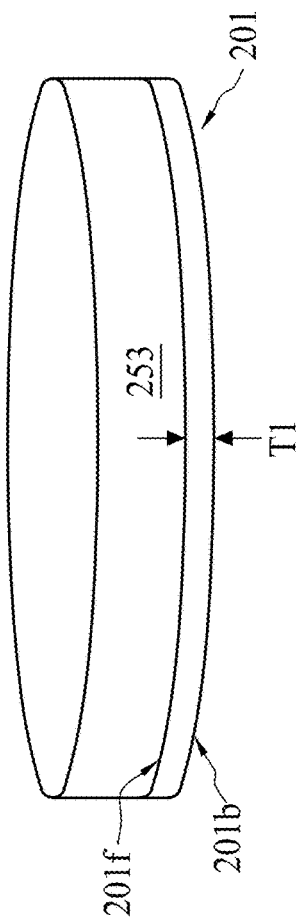
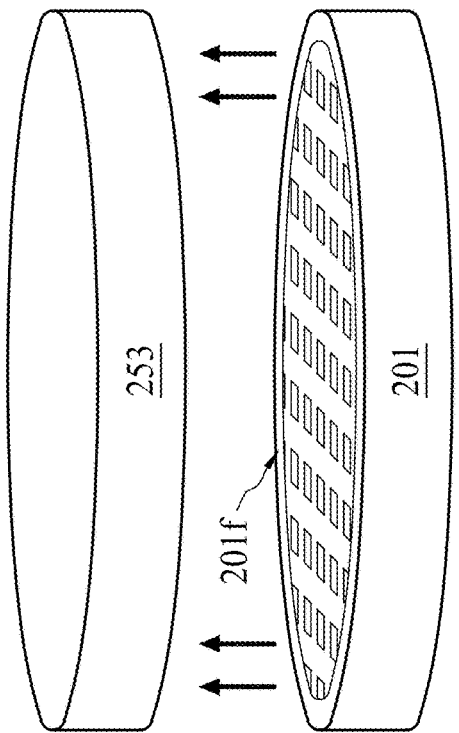
FIG. 2H
FIG. 2G

FAILURE ANALYSIS METHOD WITH IMPROVED DETECTION ACCURACY FOR ADVANCED TECHNOLOGY NODE

BACKGROUND

As technologies evolve, design and manufacturing of semiconductor devices become more complicated in view of smaller dimensions, increased functionality and more complicated circuitries. Numerous manufacturing operations are implemented within such small and high-performance semiconductor devices. Therefore, there is a continuous need to modify the structure and method of manufacturing and testing the semiconductor devices and performing failure analysis of defective parts in the semiconductor devices in order to improve device robustness as well as reduce manufacturing cost and processing time.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, dimensions of the various features may be arbitrarily increased or reduced for clarity of discussion.

FIG. 2A through FIG. 2L are schematic diagrams showing intermediate stages of fabricating and testing the semiconductor wafer shown in FIG. 1, in accordance with some embodiments.

DETAILED DESCRIPTION

Figure 1:
FIG. 1 is a flowchart showing a method of fabricating and testing a semiconductor device in a semiconductor wafer, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The term "standard cell" or "cell" used throughout the present disclosure refers to a group of circuit patterns in a design layout to implement specific functionalities of a circuit. A standard cell is comprised of various patterns in one or more layers and may be expressed as unions of polygons. A design layout may be initially constructed of an array of identical or different standard cells during the layout design stage. The geometries of the patterns in the cells may be adjusted at different stages of layout design in order to compensate for design and process effects. A standard cell may cover circuits corresponding to a portion or an entirety of a die to be manufactured. The standard cells may be accessible from a cell library provided by semiconductor circuit manufacturers or designers. Throughout the present disclosure, the standard cells are designed for implementing electronic circuits formed by semiconductor devices, e.g., a metal-oxide-semiconductor (MOS) device, and can be a planar field-effect transistor (FET) device, a fin-type FET (FinFET) device, a gate-all-around (GAA) device, a nanowire device, or the like. In some embodiments, the data of standard cells is included in a standard cell library, which may be stored in a non-transitory computer-readable storage medium and accessed by a processor in a layout operation, such as placement and routing.

The terms "couple," "coupled" and "coupling" used throughout the present disclosure describe the direct or indirect connections between two or more devices or elements. In some cases, a coupling between at least two devices or elements refers to mere electrical or conductive connections between them and intervening features may be present between the coupled devices and elements. In some other cases, a coupling between at least two devices or elements may involve physical contact and/or electrical connections.

FIG. 1 is a flowchart showing a method 100 of fabricating and testing a semiconductor device 206 in a semiconductor wafer 201, in accordance with some embodiments. It should be understood that additional steps can be provided before, during, and after the steps shown in FIG. 1, and some of the steps described below can be replaced or eliminated in other embodiments of the method 100. The order of the steps may be interchangeable. FIG. 2A through FIG. 2L are schematic diagrams showing intermediate stages of fabricating and testing the semiconductor wafer 201 shown in FIG. 1, in accordance with some embodiments.

Figure 2A:
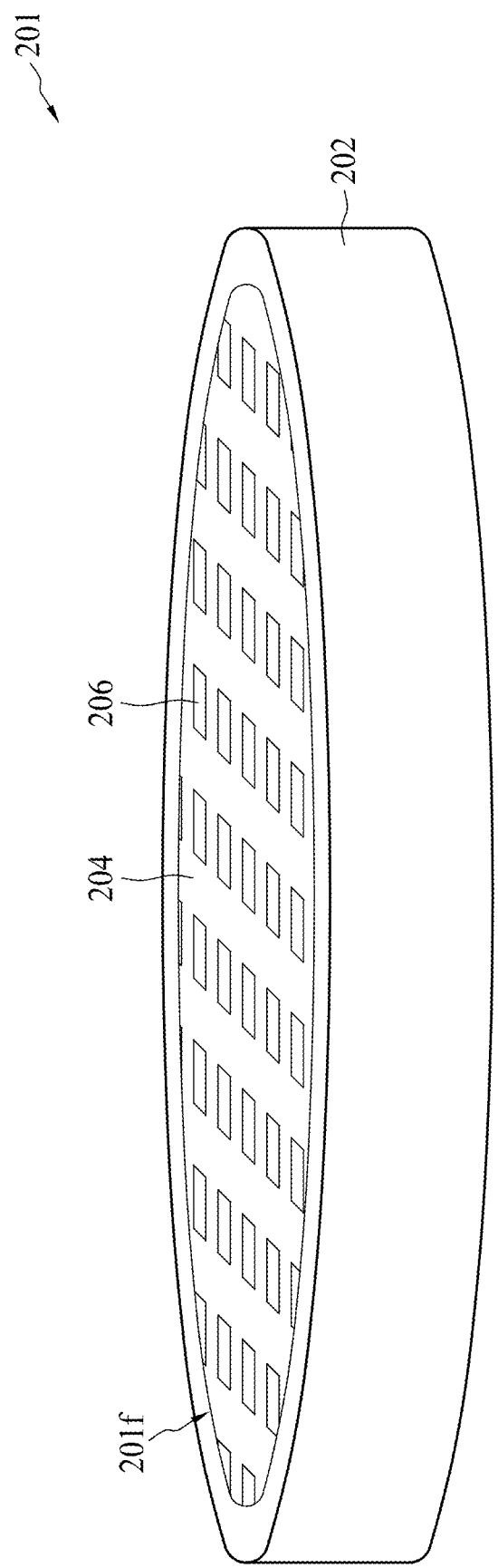

Referring to FIG. 1 and FIG. 2A, at step 102, one or more semiconductor devices 206 are manufactured on a semiconductor wafer 201. Referring to FIG. 2A, the semiconductor wafer 201 is fabricated or provided. In some embodiments, at least one of the semiconductor devices 206 is a device under test.

Figure 2B:
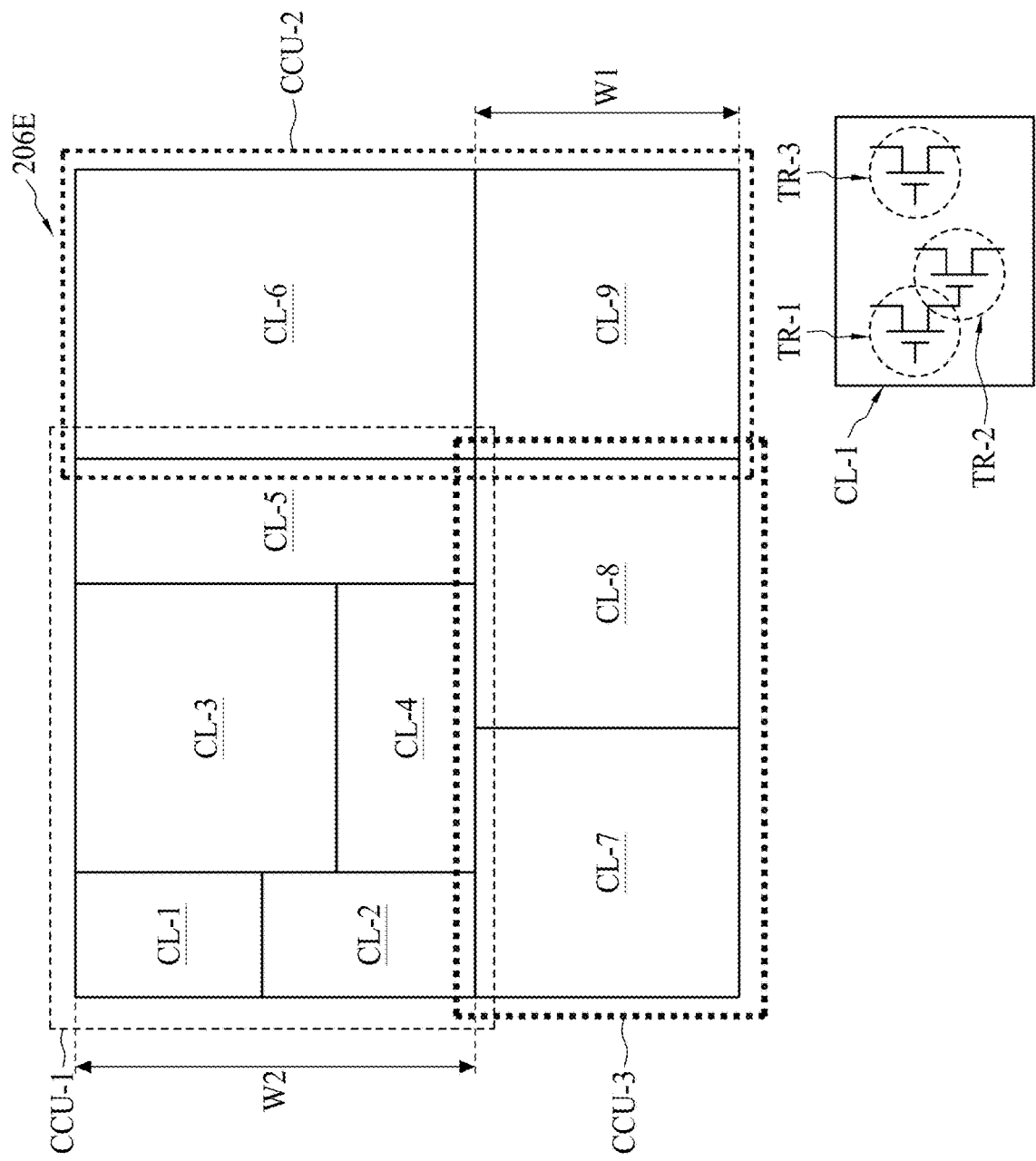

Referring to FIG. 2B, in some embodiments, the manufacturing of the semiconductor devices 206 includes a design stage for generating a design layout 206E of the semiconductor device 206. The design layout 206E is a 2D graphic representation of the electronic circuits of the semiconductor device 206 and specifies the labels, shapes, dimensions, layer information, and other 2D and 3D geometric data of the electronic circuits. The operations of the design stage may include, but are not limited to, logic design, physical design, pre-layout simulation, placement and routing, timing analysis, parameter extraction, design rule check and post-layout simulation. During the placement and routing operation, one or more cells CL, e.g., cells CL-1 through CL-9, may be placed and interconnected to form the design layout 206E. The cells CL are accessed from a cell library and placed in the design layout 206E during a placement and routing operation of the design stage. Each of the cells CL may be configured as specific logic gate devices, such as a NAND gate, an inverter gate, an AND gate, an XOR gate, a NOR gate, an And-Or-Inverter (AOI) gate, or other suitable logic gate devices. Each of the cells CL includes one or more active devices such as transistors and diodes. The detail inset of FIG. 2B shows an exemplary cell CL-1, which includes transistors TR-1, TR-2 and TR-3 electrically coupled to one another. In some embodiments, the cells CL include passive devices, such as capacitors, resistors, inductors, or the like. In some embodiments, a length or width W1 of the cell CL is between 100 nm and 500 nm, such as between 150 nm and 400 nm, or between 150 nm and 250 nm.

In some embodiments, a group of the contiguous cells CL constitute a cell cluster CCU. In the depicted example, the cells CL-1 through CL-9 constitute three cell clusters CCU-1, CCU-2 and CCU-3 as shown in FIG. 2B. The cells CL belonging to the same cell cluster CCU may be electrically coupled to perform one or more specific functions. In some embodiments, the cell cluster CCU serves as a minimal unit for semiconductor testing, e.g., in an electrical failure analysis procedure of the semiconductor device 206. The different cell clusters CCU may have different sizes, widths or lengths, depending upon various requirements such as circuit topology and testing conditions. In some embodiments, a length or width W2 of the cell cluster CCU is between about 1 μm and about 30 μm, between about 1 μm and about 20 μm, between about 1 μm and about 10 μm or between about 1 μm and about 5 μm. In some embodiments, a cell cluster CCU is formed of a single cell CL.

During an implementation stage subsequent to the design stage, the design layout 206E is used to fabricate one or more masks, and the semiconductor devices 206 are manufactured on the semiconductor wafer 201 using the one or more masks. The implementation of the masks and the semiconductor devices 206 may be performed using semiconductor manufacturing processes known in the art, such as photolithography, etching, ion implantation, deposition, planarization, and annealing.

After the design and implementation stages, each of the semiconductor devices 206 is manufactured on the semiconductor wafer 201 according to the design layout 206E and may include electronic circuits according to the layouts of the cells CL. In some embodiments, the semiconductor devices 206 are arranged in an array or matrix on a front side 201f of the semiconductor wafer 201. In some embodiments, scribe lines 204 are formed as a grid separating the array of semiconductor devices 206 and used to delimit the boundaries of the semiconductor devices 206. During a singulation operation, a dicing tool cuts through the semiconductor wafer 201 along the scribe lines 204 to form discrete semiconductor devices 206. In some embodiments where the semiconductor wafer 201 is a test wafer, the semiconductor wafer 201 is not subject to the singulation operation.

Figure 2C:
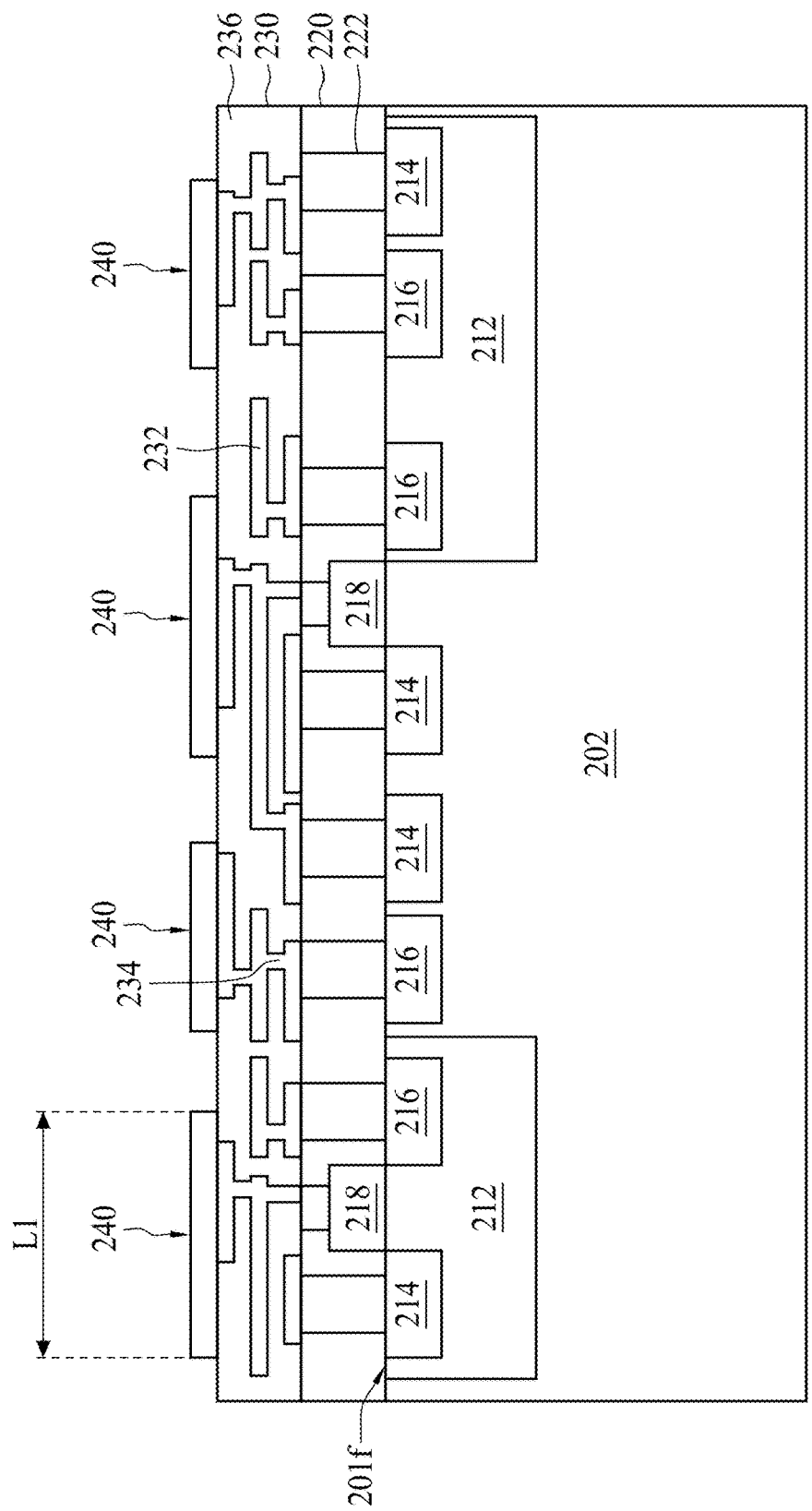

FIG. 2C illustrates a cross-sectional view 206C of an exemplary semiconductor device 206 in the semiconductor wafer 201 shown in FIG. 2A. The cross-sectional view 206C may be taken from a cross section of a portion of the semiconductor device 206 around the cell CL-1 of FIG. 2B.

Referring to FIGS. 2A and 2C, the semiconductor wafer 201 including a semiconductor substrate 202 is formed or provided. The semiconductor wafer 201 may be held by a wafer holder or a chuck (not separately shown). The semiconductor substrate 202 may include an elementary semiconductor material, such as bulk silicon. In an embodiment, the semiconductor substrate 202 may include other semiconductor materials, such as germanium, silicon germanium, silicon carbide, gallium arsenide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In some embodiments, the semiconductor substrate 202 may be a semiconductor-on-insulator (SOI) substrate or the like. Generally, an SOI substrate includes a layer of a semiconductor material formed on an insulator layer. The insulator layer may be, for example, a buried oxide (BOX) layer, a silicon oxide layer, or the like. The insulator layer is provided on a substrate layer that is typically formed of silicon or glass. Other substrates, such as a multi-layered or gradient substrate, may also be used. In some embodiments, the semiconductor substrate 202 is a P-type semiconductor substrate or an N-type semiconductor substrate.

Various components may be formed on the front surface (front side) 201f of the semiconductor substrate 202. Examples of the components include active devices, such as transistors (e.g., transistors TR-1, TR-2 and TR-3 shown in FIG. 2B) and diodes, and passive devices, such as capacitors, inductors, and resistors. The various components may include features such as well regions, doped regions, conductive lines, conductive vias and insulating regions.

In the depicted embodiment, the components of the semiconductor device 206 include one or more well regions 212. The well regions 212 may be doped with an N-type dopant, such as arsenic, phosphor, or the like, or may be doped with a P-type dopant, such as boron or the like. In some embodiments, the components of the semiconductor device 206 include one or more doped regions 214 and 216, e.g., source regions 214 and drain regions 216, and a gate region 218, for forming a transistor structure. The source regions 214 and the drain regions 216 are disposed at least partially in the semiconductor substrate 202. In some embodiments, the gate region 218 is a polysilicon gate electrode or a metal gate electrode. In a typical arrangement of a transistor, one gate region 218 is disposed over a top surface of the semiconductor substrate 202 between a pair of the source region 214 and the drain region 216. FIG. 2C only shows a planar-type transistor structure for illustrative purposes. However, the present disclosure is not limited thereto. Any non-planar transistors structures, such as a fin-type (FinFFT) transistor and a gate-all-around (GAA) transistor, are also within the contemplated scope of the present disclosure.

A dielectric layer 220 is formed over the semiconductor substrate 202. The dielectric layer 220 may include a dielectric material, such as oxide, nitride, oxynitride, or other suitable dielectric materials. One or more conductive vias 222 are formed through the dielectric layer 220 to electrically couple to the doped regions 214 and 216 and the gate regions 218. In some embodiments, the conductive vias 222 are formed of conductive materials, such as tungsten, copper, aluminum, silver, titanium, titanium nitride, combinations thereof, or the like.

In some embodiments, an interconnect layer 230 is formed over the dielectric layer 220. The interconnect layer 230 is configured to electrically couple the components in the semiconductor substrate 202 to the overlying features. In some cases, the interconnect layer 230 may establish redistributed interconnections for power or data transmission between the features in the semiconductor substrate 202. Thus, the interconnect layer 230 is also referred to as a redistribution layer (RDL). The interconnect layer 230 may include a plurality of conductive line layers, in which each of the conductive line layers includes conductive lines 232 extending along a horizontal direction and interconnected through adjacent vertical conductive vias 234. The conductive lines 232 and the conductive vias 234 may be formed of conductive materials, such as copper, tungsten, aluminum, silver, titanium, titanium nitride, combinations thereof, or the like.

In some embodiments, the aforesaid conductive lines 232 or conductive vias 234 are laterally surrounded and insulated by a dielectric layer 236. The dielectric layer 236 may be an inter-metal dielectric (IMD) layer and formed of oxides such as un-doped silicate glass (USG), fluorinated silicate glass (FSG), low-k dielectric materials, or the like.

In some embodiments, the interconnect layer 230 includes an uppermost conductive line layer having one or more conductive pads 240 exposed through the interconnect layer 230, in which the conductive pads 240 are referred to as test pads. The components of the semiconductor substrate 202 are electrically coupled to external circuits or devices through the conductive pads 240. In some embodiments, the conductive pads 240 have a width between about 10 µm and about 100 µm, between about 20 µm and about 60 µm, or between about 30 µm and about 50 µm, such as 35 µm, from a top-view perspective, for facilitating reception of a test probe of a piece of test equipment. In some embodiments, the conductive pads 240 are configured as terminals of testing inputs and outputs for each of the cell clusters CCU to thereby assist in the functionality test of the respective cell cluster CCU.

Figure 2D:
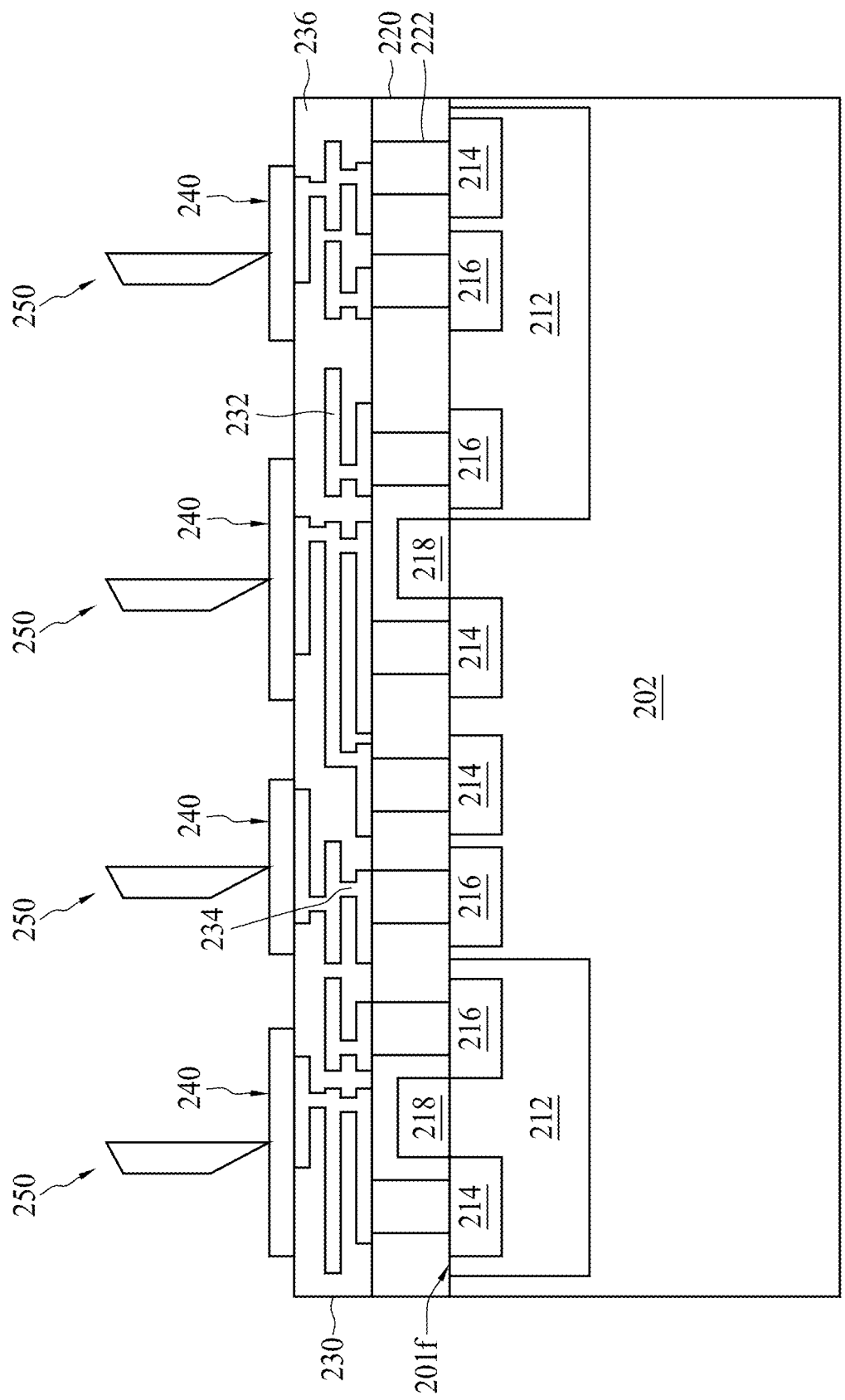

Referring to FIG. 1 and FIG. 2D, at step 104, an electrical failure analysis is performed on the semiconductor wafer 201. In some embodiments, the electrical failure analysis is performed on the basis of one cell cluster CCU. A piece of test equipment, such as a probe card (not separately shown), is provided to perform the electrical failure test. In some embodiments, some of the conductive pads 240 are configured as input terminals for the input signal, output terminals for the output (response) signal, or power supply terminals for supplying power with respect to a certain cell cluster CCU under test. The probe card may include one or more test probes 250 to electrically couple to the input terminals 240, so that the test signals can be inputted from the test equipment to the semiconductor device 206 through the test probes 250 and the input terminals. Response signals can be received by the test equipment through the test probes 250 and the output terminals. In a test result of the electrical failure analysis, if the received response signal does not match a predetermined ideal response signal, it is determined that a defect or a hot spot exists in the cell cluster CCU under test.

Figure 2F:
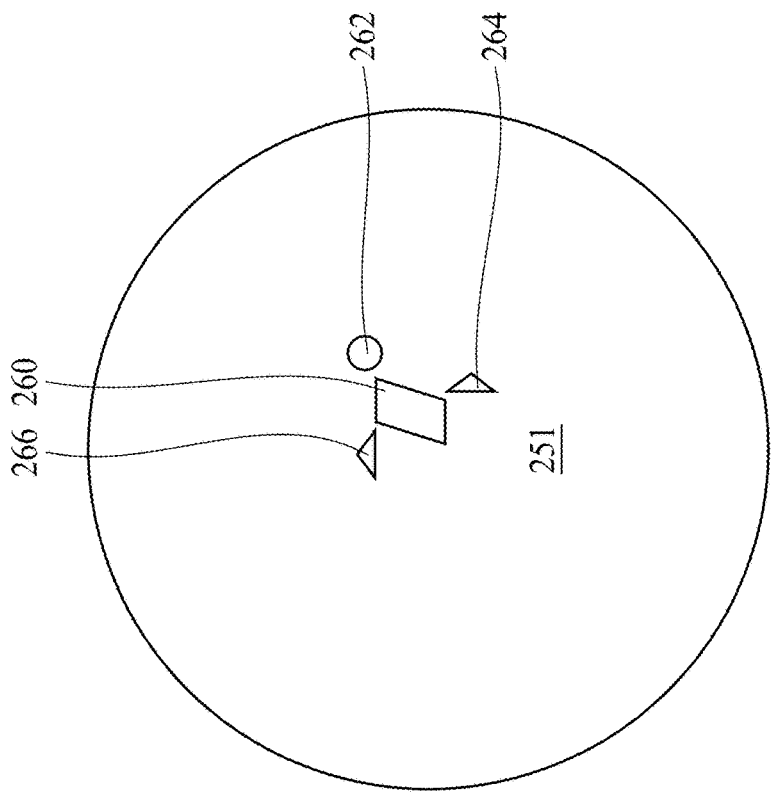
Figure 2E:
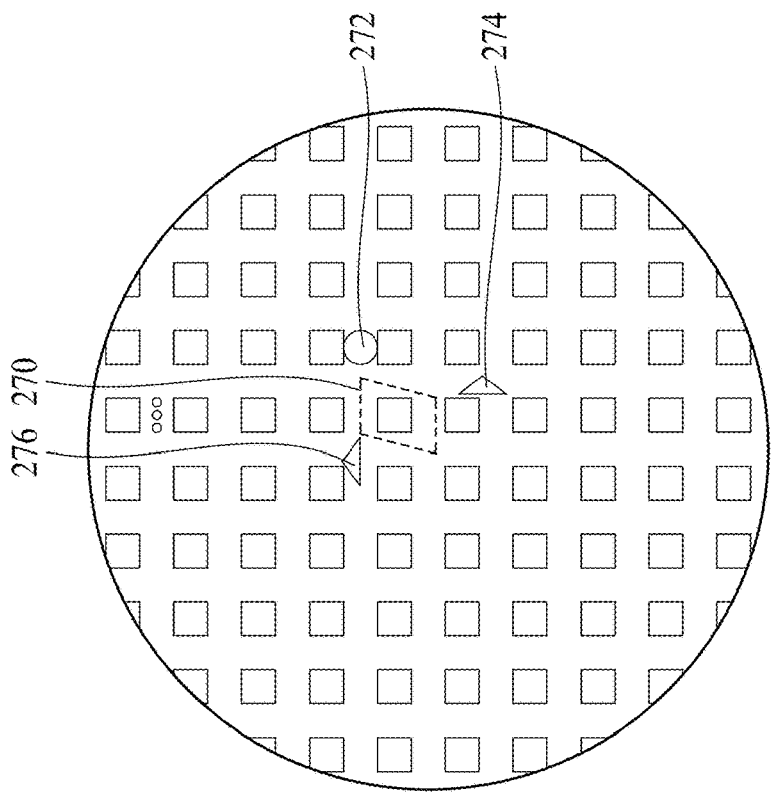

Referring to FIG. 1 and FIG. 2E, at step 106, a defective area 270 of the semiconductor wafer 201 is determined according to the test result of the electrical failure analysis. The defective area 270 is located within the semiconductor device 206 under test. In some embodiments, the defective area 270 is determined to encompass one or more cell clusters CCU including the defective cell cluster CCU where the defect or hot spot is found. In some embodiments, the boundaries of the cells CL or cell clusters CCU are difficult to distinguish in the manufactured semiconductor device 206. As such, the design layout 206E of the semiconductor device 206, which retains the layout information of the cells CL and cell clusters CCU, is leveraged to determine which cell cluster CCU the defective area 270 is related to. Through help of the design layout 206E, the identification of the defective cell cluster CCU and the location of the defective area 270 are determined. In some embodiments, the shape of the defective area 270 viewed from above is determined according to the shape of the defective cell cluster CCU. In some embodiments, the defective area 270 has a circular shape or a quadrilateral shape, such as a square, a rectangle, a diamond, a trapezoid or a parallelogram. In some embodiments, the defective area 270 is defined by the boundary of the defective cell cluster CCU. In some embodiments, the defective area 270 has an area greater than that of the defective cell cluster CCU. In some embodiments, the defective area 270 has a length or width viewed from above between about 0.5 µm and about 30 µm, between about 1 µm and about 10 µm, or between about 1 µm and about 5 µm.

After the location and size of the defective area 270 are determined, the location or coordinates of the defective area 270 in the semiconductor wafer 201 are marked accordingly. In some embodiments, to help locate the defective area 270, a set of marks 272, 274 and 276 are formed on the semiconductor wafer 201 to indicate the location of the defective area 270. In some embodiments, the marks 272, 274 and 276 are used as alignment marks used for providing positions and orientations for a carrier to be aligned. (Details of such carrier are provided below.) In some embodiments, each of the marks 272, 274 and 276 has a circular shape, an elliptical shape or a polygonal shape, such as a quadrilateral shape, a pentagonal shape, or the like. In some embodiments, each of the marks 272, 274 and 276 has a different shape or orientation, e.g., the marks 274 and 276 have similar triangular shapes with different orientations. Each of the marks 272, 274 and 276 may be arranged around the corners of the defective area 270. In some embodiments, at least one corner of the defective area 279 is free of marks. In some embodiments, the mark 272, 274 or 276 has a width or length between about 1 μm and about 200 μm.

Referring to FIG. 1 and FIG. 2F, at step 108, a substrate 251 is provided or formed. In some embodiments, the substrate 251 is a wafer used as a carrier substrate and is formed of ceramic, glass, quartz, sapphire, silicon or the like. In some embodiments, the substrate 251 has a circular shape and has a thickness between about 500 μm and about 1000 μm, such as about 760 μm. The substrate 251 may aid in identifying hot spots and is configured to allow a probing light beam to pass through during a laser-based testing operation. In some embodiments, prior to being bonded to the semiconductor wafer 201, the substrate 251 is processed to form at least one opening 260 thereon. The location of the opening 260 with respect to the substrate 251 is aligned with the location of the defective area 270 in the semiconductor wafer 201. In some embodiments, the opening 260 is a through hole extending through the entire thickness of the substrate 251. In some embodiments, the opening 260 has a shape identical to or similar to the shape of the defective area 270 from a top-view perspective. In some embodiments, the opening 260 has an area greater than the defective area 270 from a top-view perspective. In some embodiments, marks 262, 264 and 266 are provided on the substrate 251 and are used to locate the opening 260. The shapes, sizes, numbers, and configurations of the marks 262, 264 and 266 are similar to those of the marks 272, 274 and 276, respectively, and thus repeated descriptions are omitted for brevity.

Referring to FIG. 1 and FIG. 2G, at step 110, a substrate 253 is provided. In some embodiments, the substrate 253 is a carrier substrate. The substrate 253 may be a wafer formed of ceramic, glass, quartz, sapphire, silicon or the like. In some embodiments, the substrate 253 has a thickness between about 500 μm and about 1000 μm, such as about 760 μm. The front side 201f of the semiconductor wafer 201 is bonded to the substrate 253. In some embodiments, an intermediate layer, such as a release film, is used during the bonding operation for facilitating the bonding and debonding of the substrate 253.

Referring to FIG. 1 and FIG. 2H, at step 112, the semiconductor wafer 201 is thinned from a backside 201b of the semiconductor wafer 201 opposite to the front side 201f. In some embodiments, the semiconductor wafer 201 or the semiconductor substrate 202 is free of any semiconductor devices on the backside 201b. In some embodiments, the semiconductor wafer 201 includes only bulk silicon on the backside 201b. In some embodiments, the thinning operation of the semiconductor wafer 201 is performed by mechanical grinding, chemical mechanical planarization (CMP), etch-back processes, milling, laser treatment, or the like. In some embodiments, the thinned semiconductor wafer 201 has a thickness T1 less than about 200 μm. In some embodiments, the thickness T1 is less than about 100 μm or less than about 70 μm. Through the thinning operation of FIG. 2H, a portion of the semiconductor substrate 202 in the semiconductor wafer 201 is removed while the components of the semiconductor device 206 formed in the front side 201f are not adversely affected. In some embodiments, step 108 with reference to FIG. 2F can be performed after the steps 110 and 112 with reference to FIGS. 2G and 2H. Alternatively, step 108 can be performed at the same time as the step 110 or 112.

Figure 2I:
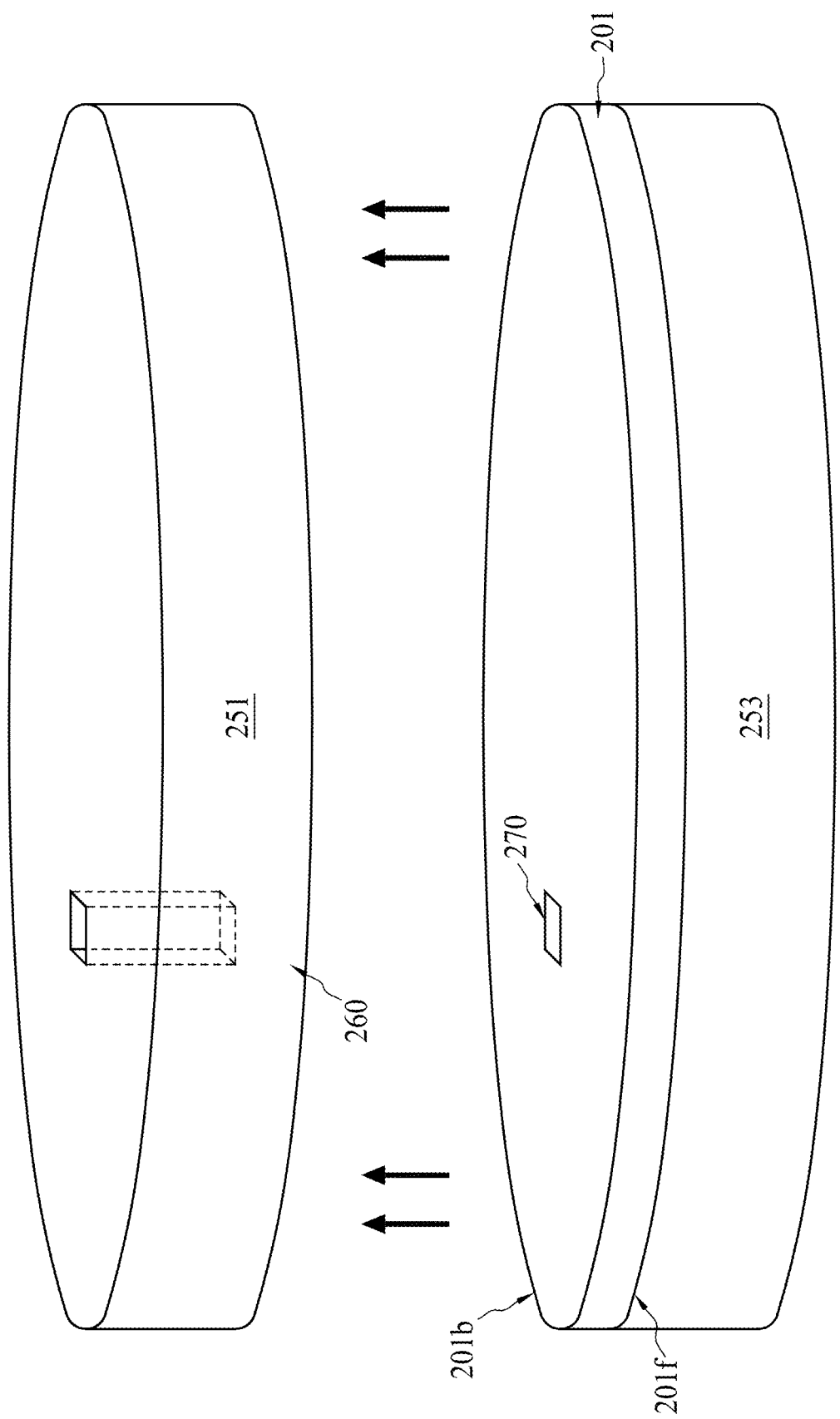
Figure 2J:
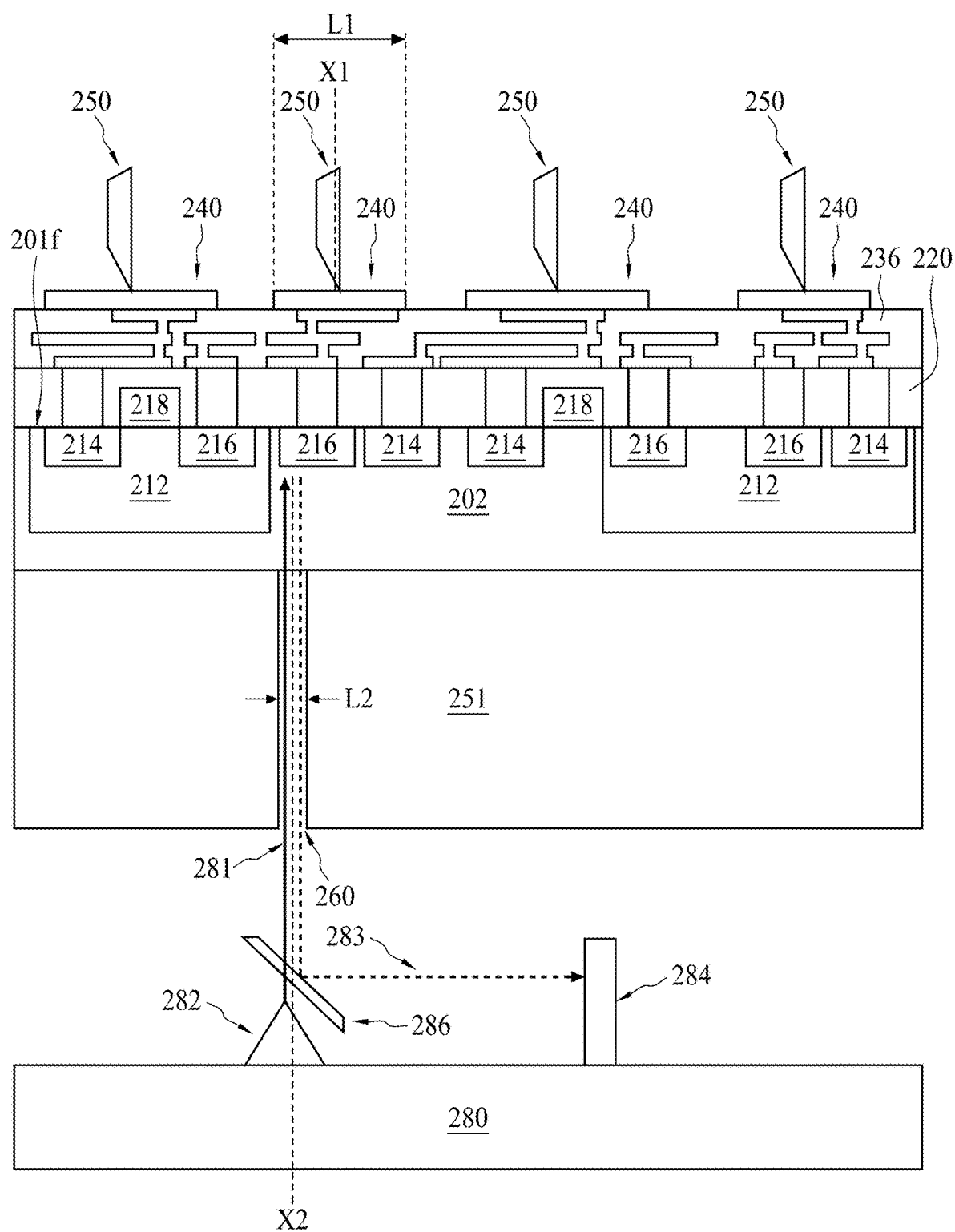

In some embodiments, a thickness limit Tx of the thinned semiconductor wafer 201 is determined according to a wavelength of a light beam used in a laser-based testing scheme (see FIG. 2J). The final thickness T1 attained through the thinning operation is no greater than the thickness limit Tx for ensuring successful emission and reception of the test light beam through the material of the semiconductor substrate 202.

Referring to FIG. 1 and FIG. 2I, at step 114, the substrate 251 is bonded to the semiconductor wafer 201 from the backside 210b of the thinned semiconductor wafer 201. The defective area 270 is aligned with the opening 260 and exposed thorough the opening 260. In some embodiments, during an alignment operation, the substrate 251 and the semiconductor wafer 201 are held by a bonding tool and moved in relation to each other while aligning the marks 262, 264 and 266 on the substrate 251 with the corresponding marks 272, 274 and 276 to ensure that the defective area 270 is aligned with and exposed through the opening 260. After the bonding operation, the substrate 253 is debonded or removed from the semiconductor wafer 201 and the semiconductor wafer 201 is flipped.

Referring to FIG. 1 and FIG. 2J, at step 116, a laser voltage testing scheme is performed on the defective area 270 to locate the defect more accurately within the defective area 270. In some embodiments, a laser-based test equipment 280 is provided to perform the laser voltage testing scheme. The laser-based test equipment 280 includes an emitter 282 configured to emit a light beam 281. The light beam 281 is projected onto the defective area 270 through the opening 260 to determine a defective region within the defective area 270. In some embodiments, the emitter 282 is a laser diode configured to emit the light beam 281 having a wavelength centered at less than about 1200 nm, such as at about 1064 nm, 785 nm or 577 nm. The incident light beam 281 propagates in the channel formed by the opening 260 and reaches the defective area 270. In some embodiments, the light beam 281 has a spatial resolution of less than about 500 nm, less than 350 nm, or less than 250 nm, e.g., between 100 nm and about 250 nm. In some embodiments, the light beam 281 has a spatial resolution between about 100 nm and 170 nm.

In some embodiments, the laser-based test equipment 280 further includes a detector 284 and an optical member 286 (such as a mirror or a prism) for collecting a light beam 283 reflected from the defective area 270 through the detector 284. In some embodiments, the detector 284 is a light sensor for receiving light and may be a photodiode. In some embodiments, a laser voltage imaging method is used for testing the defective area 270, in which the defective area 270 is partitioned into a grid of test regions and the light beam 281 is used to scan through all the test regions in a predetermined sequence. When the light beam 281 is projected onto a test region, the incident light beam 281 impinges on the components of the semiconductor device 206, for example, the doped regions 214 and 216 and the well region 212, in the respective test region. The reflected light beam 283 is modulated in frequency, phase, delay, or voltage by the component corresponding to the test region. In some embodiments, the size of the test region is determined by the spatial resolution of the light beam 281, the thickness of the thinned semiconductor substrate 202 and the configuration of the substrate 251.

Figure 2K:
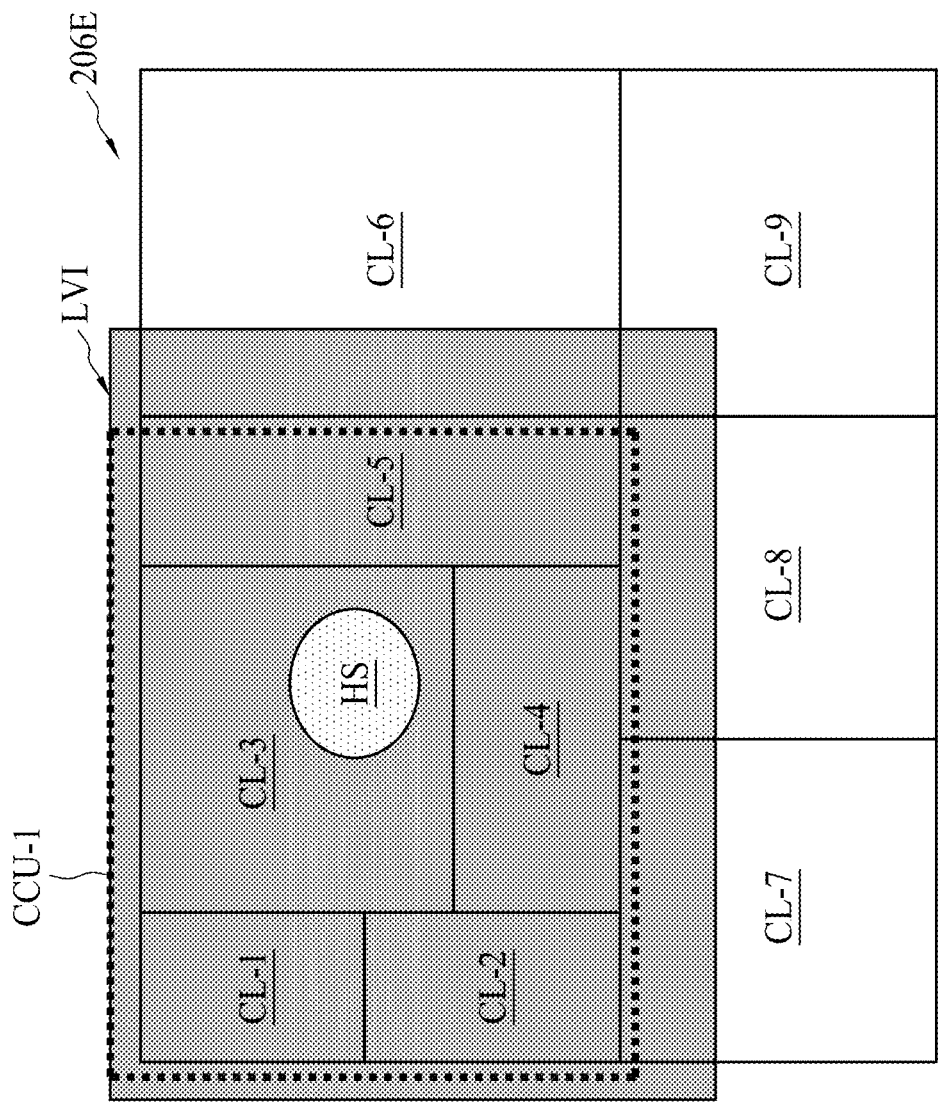

Referring to FIG. 2K, as the light beam 281 scans through all the test regions, the modulated light beams 283 reflected from the test regions are collected by the detector 284 and converted to a laser voltage image LVI, which shows a 2D voltage distribution of the defective area 270. In some embodiments, the laser voltage image LVI shows a 2D distribution in terms of other electrical characteristics, such as conductivity or resistance. In some embodiments, the laser voltage image LVI is represented in a greyscale form or is color coded, in which the grey levels or color codes represent different levels of voltages or electrical characteristics of the components. In some embodiments, the laser voltage image LVI is a compiled result of a voltage difference between an ideal voltage distribution and the voltage distribution obtained through the reflected light beams 283.

Assume that the defective area 270 of the semiconductor device 206 is located within the cell cluster CCU-1, which encompasses five cells CL-1, CL-2, CL-3, CL-4 and CL-5. Additionally, the laser voltage image LVI shows a defect-induced highlighted area HS shown in a light shade in contrast to the remaining normal areas in dark shades. In some embodiments, information on cell boundaries of the cells CL is not available in the laser voltage image LVI. Therefore, the graphical data of the design layout 206E is leveraged and overlaid with the laser voltage image LVI to determine the defective cell that includes or corresponds to the defective area HS. As a result, the defective cell CL, instead of the whole defective area 270, can be identified more accurately and determined as a defective region. Accordingly, a subsequent physical failure analysis can be performed with greater efficiency.

In some embodiments, a laser voltage probing method is utilized in the laser-based testing scheme, in which the test signal is inputted to the semiconductor device 206 while the light beam 281 impinges onto the defective area 270. An input test signal is transmitted to a certain cell cluster CCU through the conductive pads 240 along with one or more biasing signals biasing the semiconductor device 206. When the one or more active devices, e.g., transistors, within the defective area 270 are biased, the light beam 281 is directed to excite one or more doped regions or well regions in the defective area without illuminating or exciting adjacent features. In some embodiments, the electrical properties of a defective component, such as its conduction voltage or current, may be altered due to the excitation of the impinged light beam 281. The output testing signal for the cell cluster CCU may exhibit different waveforms before and after the application of the light beam 281. As a result, the defective region can be identified with greater accuracy and further limited to a smaller test region if the range of excitation is limited to a desired range. In some embodiments, the defective region is a cell of the semiconductor device 206. In some embodiments, the defective region is a well region or a doped region in a cell of the semiconductor device 206 of the semiconductor wafer 201. Accordingly, the subsequent physical failure analysis can be performed on the identified defective cell with greater efficiency due to a relatively small number of transistors included in the defective region, which is less than the number of transistors included in the whole defective area 270, to be tested.

Referring to FIG. 2J, when the test probes 250 are coupled to the conductive pads 240, a downward engagement force is applied to the test probes 250 to ensure reliable contact between the test probes 250 and the conductive pads 240. The conductive pads 240 may break or be damaged by the engagement force. To ensure structural integrity of the conductive pads 240 during the testing operation, the opening 260 is made smaller than the conductive pads 240 if the conductive pad 240 and the opening 260 at least partially overlap such that the solid portions of the substrate 251 can provide mechanical strength for the conductive pads 240. In some embodiments, the material of the substrate 251 overlaps the conductive pad 240 by at least 10%, 20% or 40% of the width of the conductive pad 240. In some embodiments, the opening 260 has a width L2 less than a width L1 of the conductive pads 240 from a top-view perspective. The width L2 may be between about 1 μm and about 50 μm, between about 1 μm and about 35 μm, or between about 3 μm and about 35 μm.

In some embodiments, given that the conductive pad 240 partially overlaps the opening 260 and the width L2 is equal to or greater than the width L1, the central axis X1 of the opening 260 is offset from the central axis X2 of the conductive pad 240 so that at least part of the conductive pad 240 overlaps the material of the substrate 251 to ensure that the conductive pad 240 at least partially overlaps the opening 260 and partially overlaps the material of the substrate 251.

Figure 2L:
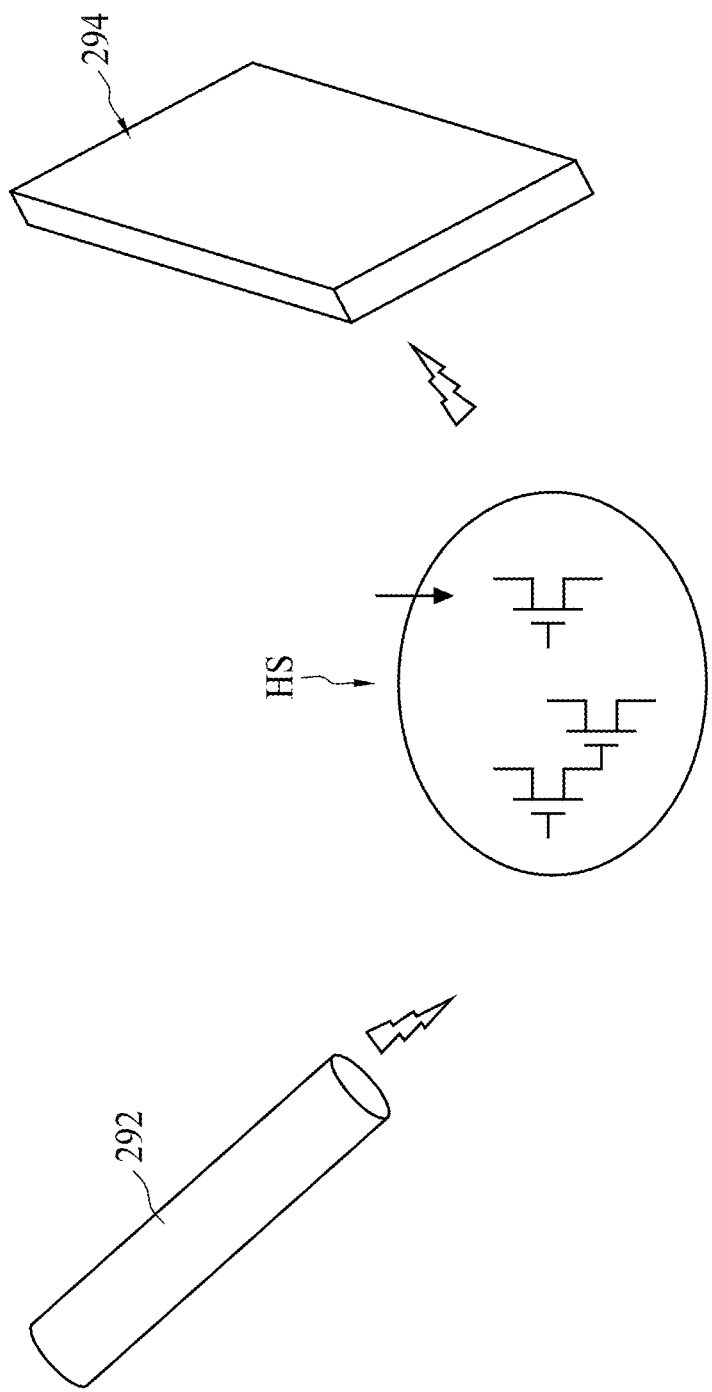

Referring to FIG. 1 and FIG. 2L, at step 118, a physical failure analysis is performed on the defective region corresponding to the defective area HS within the defective area 270. In some embodiments, the physical failure analysis is performed on the defective cell CL in the defective cell cluster CCL in which the defective cell CL coincides with the defective area HS. In some embodiments, the defective region is identified through the laser-based testing scheme performed in step 116, in which the area and the number of active devices in the defective area HS is less than those of the defective area 270. In some embodiments, the physical failure analysis includes a non-destructive analysis, such as optical inspection, and a destructive analysis, such as delayering, failure site isolation and mechanical cross-sectioning.

For example, FIG. 2L illustrates an optical inspection system, which includes an energy source 292 and an imaging device 294 disposed adjacent to the semiconductor wafer 201. The energy source 292 may be configured to emit electron or optical beams onto the defective area HS on the semiconductor wafer 201, and the imaging device 294 is configured to generate an image based on the emitted beams. The optical image may exhibit feature profiles of the defective area HS. A defect inspection may be conducted to examine the optical image and determine if any circuit defect is found in the defective area HS.

Existing laser-based testing schemes are conducted by emitting the light beam 281 toward the defective area 270 through the material of the semiconductor substrate 202 with a sufficient thickness, e.g., greater than about 100 μm. Such testing schemes enjoy many advantages in the endeavor of semiconductor testing, such as high spatial resolution and ability to perform non-destructive testing through the semiconductor substrate 202. To address the requirement of identifying defective semiconductor devices with miniature footprint in advanced nodes, the wavelength of the light beam 281 is also reduced to enhance the spatial resolution. However, as the wavelength of the light beam 281 is made smaller, the energy or the penetrating power of the laser beam is reduced as well. As a result, the incident light beam 281 induces undesired optical effects, such as absorption, attenuation, scattering and defocusing by the semiconductor substrate 202. As discussed previously, the success of the laser-based testing scheme is the final size of the defective area HS, which is closely related to the spatial resolution of the light beam 281. The existing light beam 281, which passes through the material of the semiconductor substrate 202, is not be able to render a focused and high-energy light beam due to the obstacle of the semiconductor substrate 202. Therefore, the existing light beam 281 cannot reduce the size of the defective area HS during the testing operation. This in turn increases the burden of the subsequent testing operation, e.g., physical failure analysis.

Through the proposed substrate 251, the semiconductor wafer 201 can be thinned to a relatively small thickness of less than about 100 µm while still being robust due to the protection of the substrate 251. Meanwhile, the light beam 281 is allowed to propagate through the opening 260 and reaches the active devices of the semiconductor device 206 on the front side 201f through a relatively small thickness of the semiconductor substrate 202. The adverse impact of the substrate 251 and the semiconductor substrate 202 is minimized and the undesired optical effects, such as scattering and attenuation, are significantly reduced or mitigated. In some embodiments, the spatial resolution of the light beam 281 free of the aforesaid optical effects can be as small as 100 nm. As such, the width of the defective area HS can be limited to an area of approximately 100 nm, which is less than the width W1 of a cell. The physical failure analysis can be performed with a greater accuracy and efficiency without an exhaustive test across the whole defective area 270.

Figure 3:
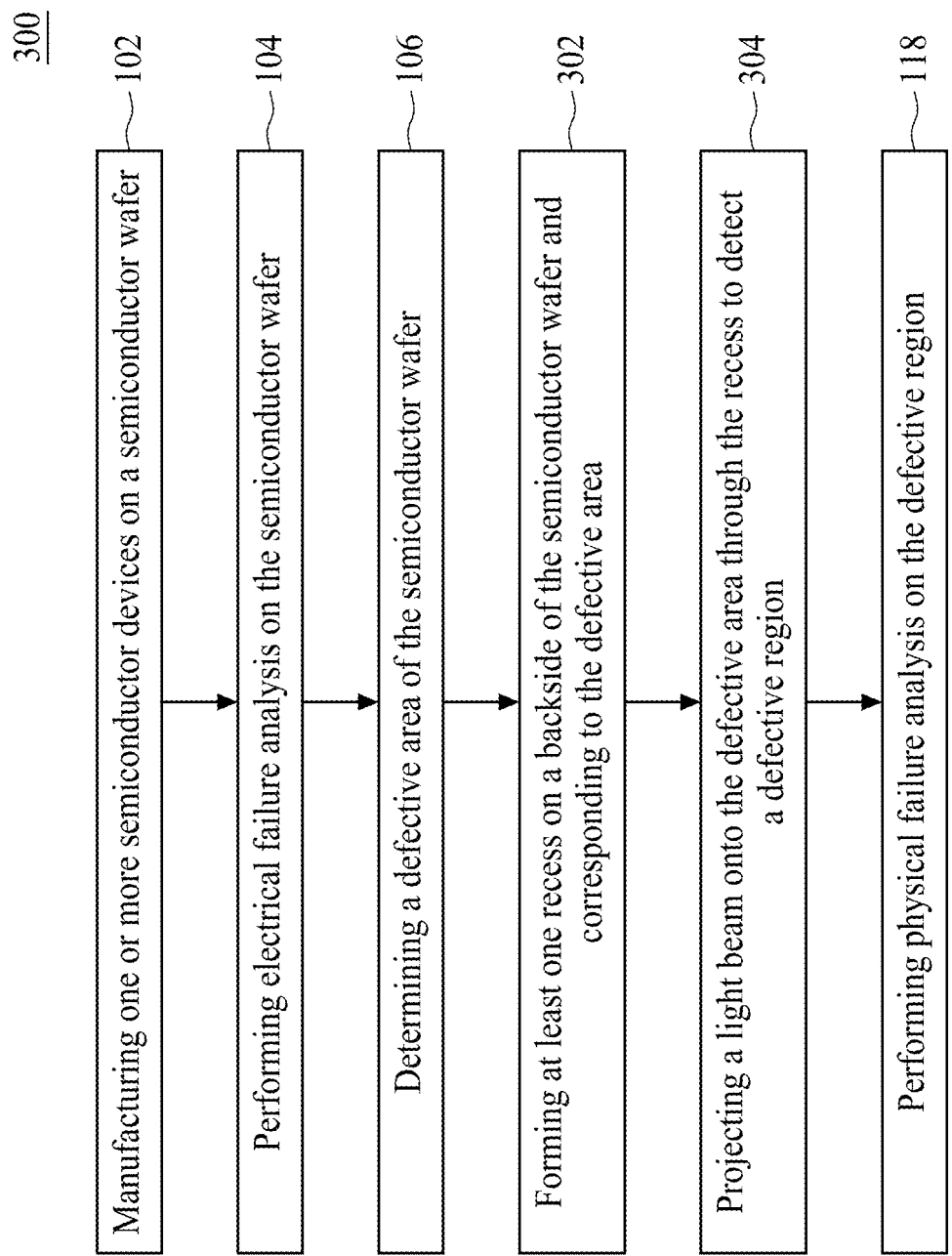
FIG. 3 is a flowchart showing a method of fabricating and testing a semiconductor device in a semiconductor wafer, in accordance with some embodiments.

FIG. 3 is a flowchart showing a method 300 of fabricating and testing a semiconductor device 206 in a semiconductor wafer 201, in accordance with some embodiments. It should be understood that additional steps can be provided before, during, and after the steps shown in FIG. 3, and some of the steps described below can be replaced or eliminated in other embodiments of the method 300. The order of the steps may be interchangeable.

Referring to FIG. 3, steps 102 to 106 shown in the method 300 are similar to those shown in FIG. 1 and FIGS. 2A to 2E, and thus repeated descriptions are omitted for brevity.

Figure 4A:
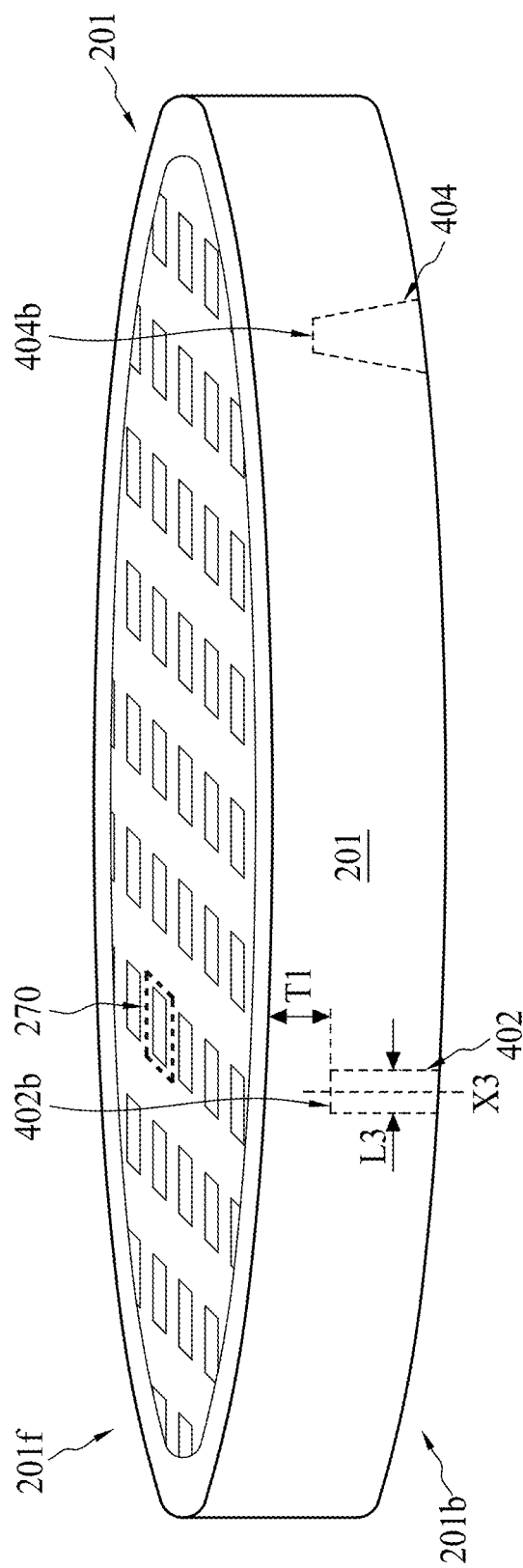
FIGS. 4A and 4B are schematic diagrams showing intermediate stages of fabricating and testing the semiconductor wafer shown in FIG. 3, in accordance with some embodiments.

Referring to FIG. 3 and FIG. 4A, at step 302, a recess 402 or 404 is formed on the backside 201b of the semiconductor wafer 201. The method 300 proceeds with the operation shown in FIG. 4A immediately following the operation shown in FIG. 1E. In some embodiments, the recess 402 or 404 corresponds to the defective area 720. In some embodiments, the recess 402 or 404 is exposed on the backside 201b of the semiconductor wafer 201. In some embodiments, the semiconductor wafer 201 has a thickness T1 between the front side 201f and the surface 402b or 404b of the respective recess 402 or 404. The determination of the thickness T1 is similar to the determination of the thickness T1 in FIG. 2H. Through the thinning operation of FIG. 4A, a portion of the semiconductor substrate 202 in the semiconductor wafer 201 is removed while the components of the semiconductor device 206 formed in the front side 201f are not adversely affected. In some embodiments, the recess 402 or 404 has a shape identical to or similar to the shape of the defective area 270 from a top-view perspective.

To ensure structural integrity of the conductive pads 240 during the testing operation, the recess 402 or 404 is made smaller than the width L1 of the conductive pads 240 such that the semiconductor substrate 202 can provide support strength to the conductive pads 240. In some embodiments, the recess 402 or 204 may have a width L3 viewed from above between about 1 µm and about 50 µm, or between about 3 µm and about 35 µm. In some embodiments, the conductive pad 240 at least partially overlaps the material of the semiconductor substrate 202. In some embodiments, referring to FIGS. 4A and 2J, when the width L3 is equal to or greater than the width L1, the central axis X3 of the recess 402 is offset from the central axis X1 of the conductive pad 240 so that at least part of the conductive pad 240 overlaps the material of the semiconductor substrate 202.

In some embodiments, the recess 402 or 404 includes inclined sidewalls. The recess 402 or 404 may taper from the backside 201b toward the front side 201f. In some embodiments, the recess 402 or 404 is formed by an etching operation such as a dry etch, a wet etch, a combination thereof, or the like. Alternatively, the recess 402 or 404 is formed using etch-back operations, milling, laser techniques, or the like. In some embodiments, a surface treatment, e.g., laser treatment, is performed on the horizontal surface 402b or 404b of the respective recess 402 or 404 to enhance the planarity of the surface 402b or 404b. The surface treatment may be helpful in reducing the reflection and scattering of the incident light beam 281 at the interface formed by the surface 402b or 404b.

Figure 4B:
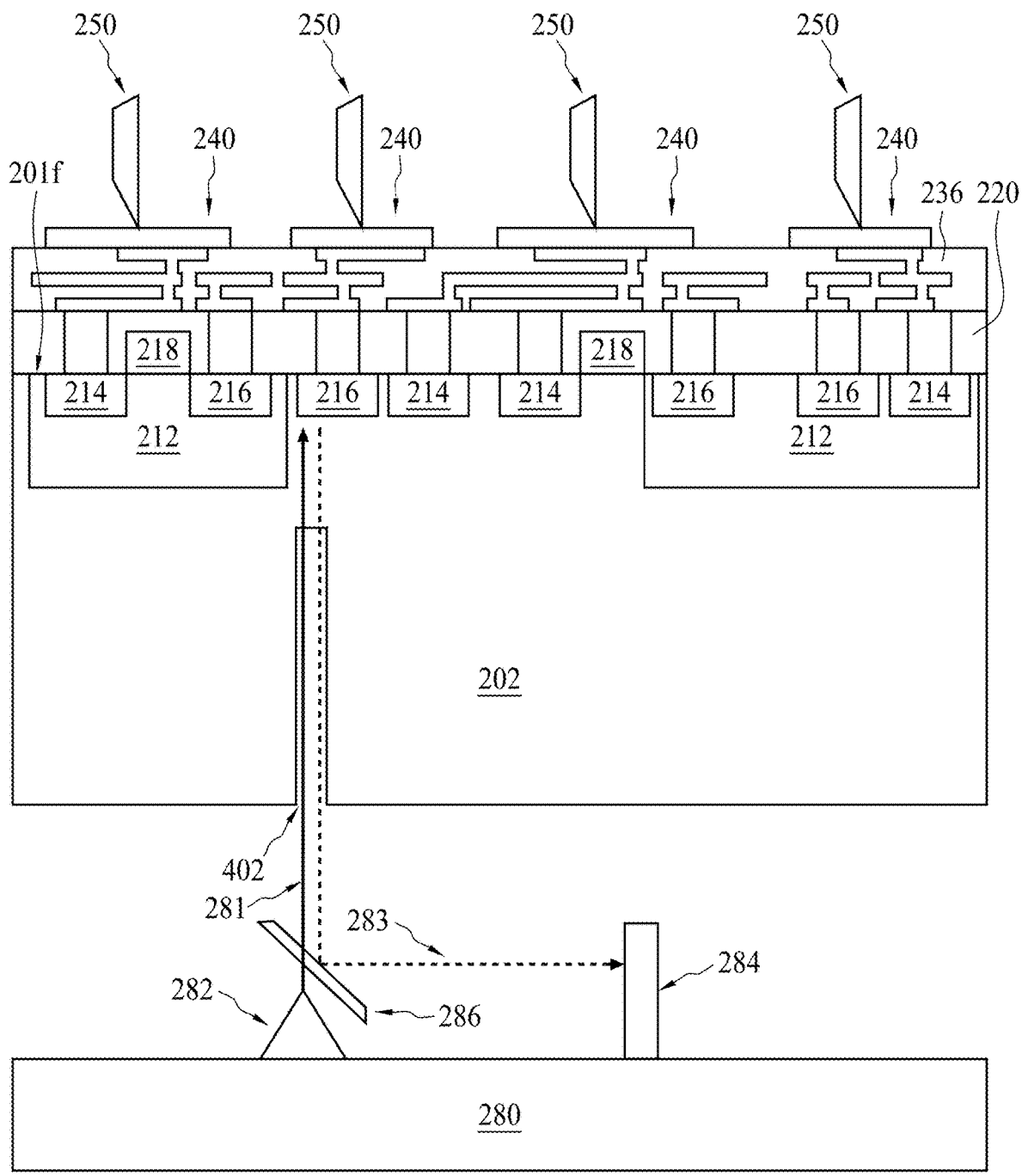

Referring to FIG. 3 and FIG. 4B, at step 304, a light beam 281 is projected onto the defective area 270 through the recess 402 or 404. The step 304 with reference to FIG. 4B is similar to the step 116 with reference to FIGS. 2J and 2K, and the difference lies in the etched semiconductor substrate 202 having the recess 402 in place of the substrate 251 having the opening 260 and the thinned semiconductor wafer 201.

Referring to FIG. 3, at step 118, a physical failure analysis is performed on the defective area HS (see FIG. 2K) in a manner similar to those shown in FIG. 1 with reference to FIG. 2L, and thus repeated descriptions are omitted for brevity.

Figure 5:
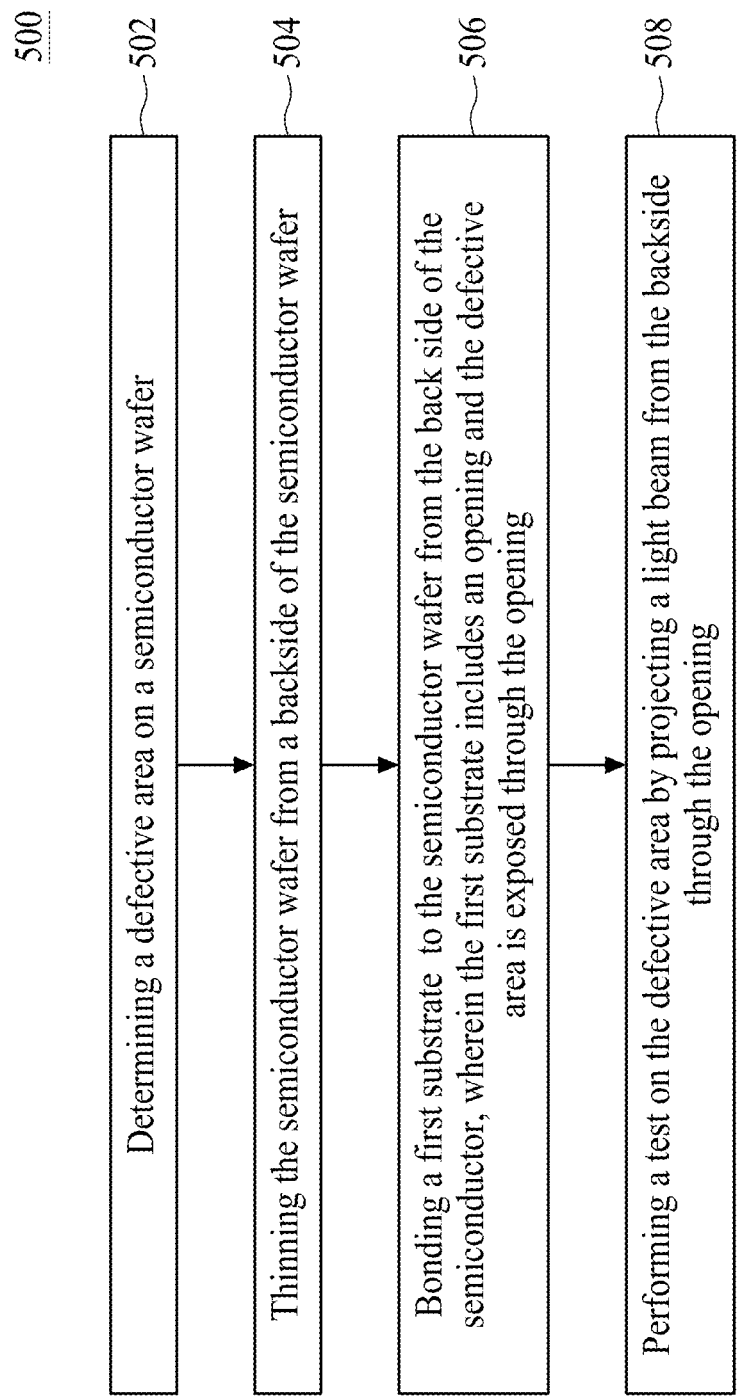
FIG. 5 is a flowchart showing a method of fabricating and testing a semiconductor device in a semiconductor wafer, in accordance with some embodiments.

FIG. 5 is a flowchart showing a method 500 of fabricating and testing a semiconductor device in a semiconductor wafer, in accordance with some embodiments. It should be understood that additional steps can be provided before, during, and after the steps shown in FIG. 5, and some of the steps described below can be replaced or eliminated in other embodiments of the method 500. The order of the steps may be interchangeable.

At step 502, a defective area is determined on a semiconductor wafer. At step 504, the semiconductor wafer is thinned from a backside of the semiconductor wafer.

At step 506, a first substrate is bonded to the semiconductor wafer from the backside of the semiconductor. The first substrate includes an opening and the defective area is exposed through the opening. At step 508, a test is performed by projecting a light beam on the defective area from the backside through the opening.

Figure 6:
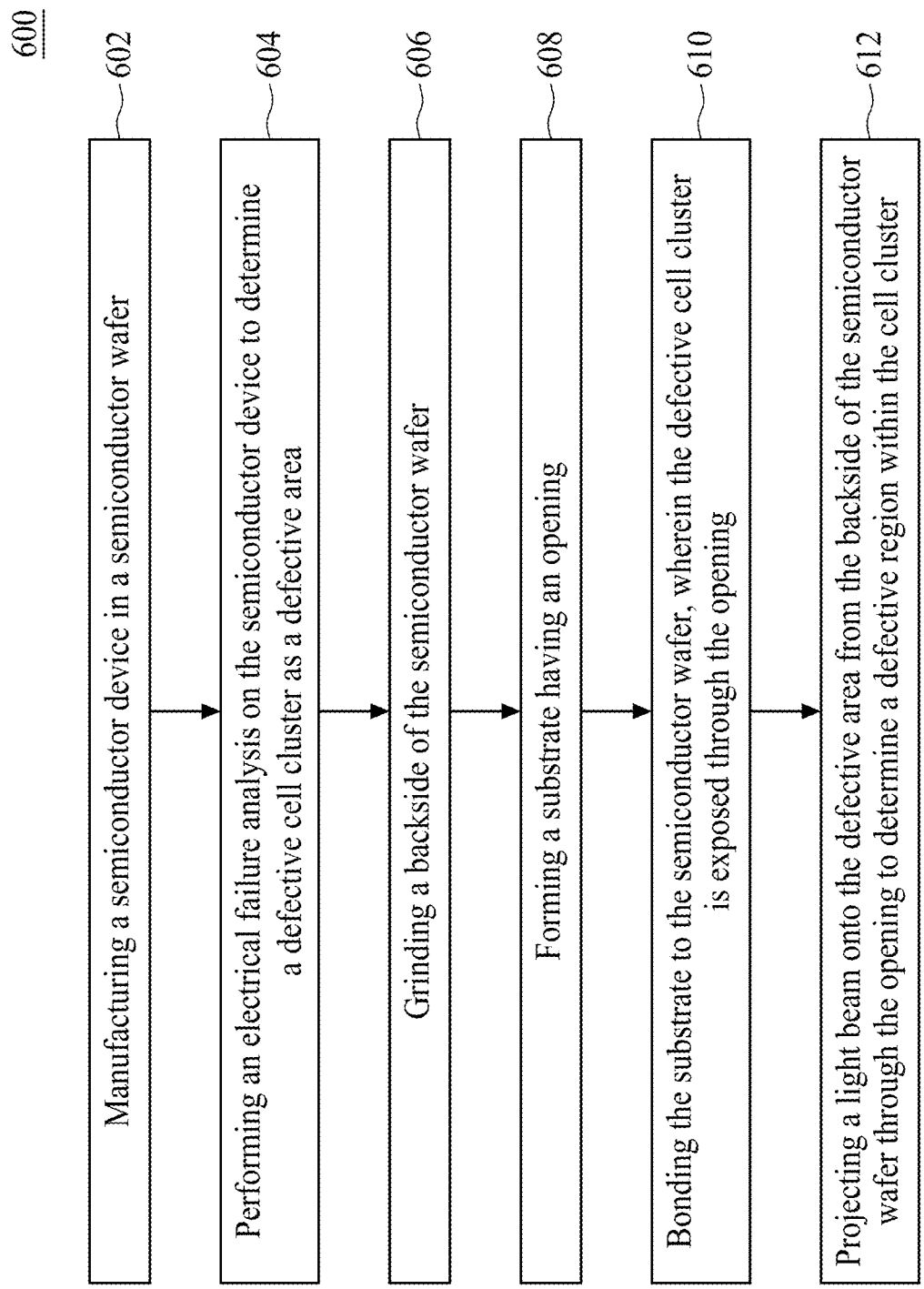
FIG. 6 is a flowchart showing a method of fabricating and testing a semiconductor device in a semiconductor wafer, in accordance with some embodiments.

FIG. 6 is a flowchart showing a method 600 of fabricating and testing a semiconductor device in a semiconductor wafer, in accordance with some embodiments. It should be understood that additional steps can be provided before, during, and after the steps shown in FIG. 6, and some of the steps described below can be replaced or eliminated in other embodiments of the method 600. The order of the steps may be interchangeable.

At step 602, a semiconductor device is manufactured in a semiconductor wafer. The semiconductor device includes a plurality of cells and the plurality of cells constitute a plurality of cell clusters. At step 604, an electrical failure analysis is performed on the semiconductor device to determine a defective cell cluster as a defective area.

At step 606, a backside of the semiconductor wafer is ground. At step 608, a substrate having an opening is formed. At step 610, the substrate is bonded to the semiconductor wafer and the defective cell cluster is exposed through the opening. At step 612, a light beam is projected on the defective area from the backside of the semiconductor wafer through the opening to determine a defective region within the cell cluster.

Figure 7:
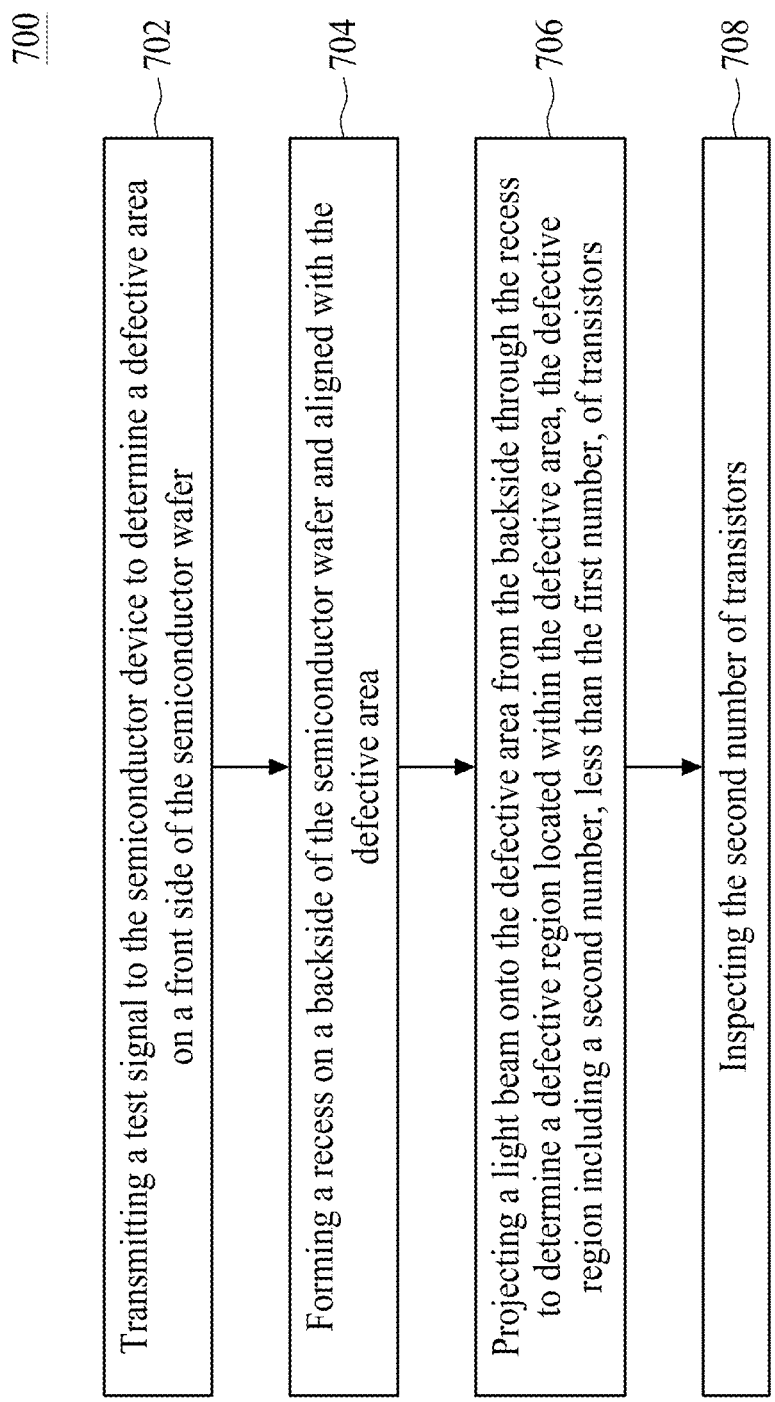
FIG. 7 is a flowchart showing a method of fabricating and testing a semiconductor device in a semiconductor wafer, in accordance with some embodiments.

FIG. 7 is a flowchart showing a method 700 of fabricating and testing a semiconductor device in a semiconductor wafer, in accordance with some embodiments. It should be understood that additional steps can be provided before, during, and after the steps shown in FIG. 7, and some of the steps described below can be replaced or eliminated in other embodiments of the method 700. The order of the steps may be interchangeable.

At step 702, a test signal is transmitted to the semiconductor device to determine a defective area on a front side of the semiconductor wafer. The defective area includes a first number of transistors. At step 704, a recess is formed on a backside of the semiconductor wafer and aligned with the defective area.

At step 706, a light beam is projected ono the defective area from the backside through the recess to determine a defective region located within the defective area. The defective region includes a second number of transistors and the second number is less than the first number. At step 708, the second number of transistors are inspected.

According to an embodiment, a method includes: determining a defective area in a semiconductor device of a semiconductor wafer; thinning the semiconductor wafer from a backside of the semiconductor wafer; bonding a first substrate to the backside of the semiconductor wafer, wherein the first substrate has an opening and the defective area is exposed through the opening; and performing a test on the defective area by projecting a light beam from the backside through the opening.

According to an embodiment, a method includes: manufacturing a semiconductor device in a semiconductor wafer, the semiconductor device including a plurality of cells and the plurality of cells constituting a plurality of cell clusters; performing an electrical failure analysis on the semiconductor device to determine a defective cell cluster as a defective area; grinding a backside of the semiconductor wafer; forming a substrate having an opening; bonding the substrate to the semiconductor wafer, wherein the defective cell cluster is exposed through the opening; and projecting a light beam onto the defective area from the backside of the semiconductor wafer through the opening to determine a defective region within the cell cluster.

According to an embodiment, a method includes: transmitting a test signal to a semiconductor device in a semiconductor wafer to determine a defective area on a front side of the semiconductor wafer, the defective area including a first number of transistors; forming a recess on a backside of the semiconductor wafer and aligned with the defective area; projecting a light beam onto the defective area from the backside through the recess to determine a defective region located within the defective area, the defective region including a second number, less than the first number, of transistors; and inspecting the second number of transistors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   determining a defective area in a semiconductor device of a semiconductor wafer;
   thinning the semiconductor wafer from a backside of the semiconductor wafer;
   bonding a first substrate to the backside of the semiconductor wafer, wherein the first substrate comprises an opening and the defective area is exposed through the opening; and
   performing a test on the defective area by projecting a light beam from the backside through the opening.

2. The method according to claim 1, further comprising determining a defective region in the defective area based on an image according to a reflected light beam in response to the projected light beam.

3. The method according to claim 2, further comprising performing a physical failure analysis on the defective region.

4. The method according to claim 2, wherein the defective region has a first width less than a second width of a cell of the semiconductor device.

5. The method according to claim 1, further comprising bonding a front side of the semiconductor wafer, opposite to the backside, to a carrier substrate, wherein the semiconductor wafer is thinned from the backside of the semiconductor wafer.

6. The method according to claim 5, further comprising debonding the carrier substrate from the semiconductor wafer subsequent to the thinning of the semiconductor wafer.

7. The method according to claim 1, further comprising forming a first mark on the semiconductor wafer for indicating a location of the defective area and a second mark on the first substrate for indicating a location of the opening.

8. The method according to claim 7, wherein the bonding of the first substrate to the semiconductor wafer comprises aligning the opening with the defective area according to the first mark and the second mark.

9. The method according to claim 1, further comprising forming a conductive pad arranged on the semiconductor wafer and configured to receive a test probe, wherein the opening has a first width from a top-view perspective less than a second width of the conductive pad from a top-view perspective.

10. The method according to claim 9, further comprising performing an electrical failure analysis by transmitting a first test signal from the test probe through the conductive pad, wherein the defective area is determined according to the electrical failure analysis.

11. The method according to claim 9, further comprising transmitting a second test signal to the defective area of the semiconductor wafer while performing the test on the defective area.

12. The method according to claim 1, further comprising determining a thickness limit of the semiconductor wafer according to a wavelength of the light beam, wherein the semiconductor wafer is thinned to a first thickness no greater than the thickness limit.

13. A method, comprising:
    manufacturing a semiconductor device in a semiconductor wafer, the semiconductor device comprising a plurality of cells and the plurality of cells constituting a plurality of cell clusters;

performing an electrical failure analysis on the semiconductor device to determine a defective cell cluster as a defective area;

grinding a backside of the semiconductor wafer;

forming a substrate having an opening;

bonding the substrate to the semiconductor wafer, wherein the defective cell cluster is exposed through the opening; and projecting a light beam onto the defective area from the backside of the semiconductor wafer through the opening to determine a defective region within the cell cluster.

14. The method according to claim 13, wherein the ground semiconductor wafer has a thickness less than about 100 µm.

15. The method according to claim 13, further comprising performing a physical failure analysis on a defective cell of the defective cell cluster in which the defective region resides.

16. The method according to claim 13, wherein the manufacturing of the semiconductor device comprises:

generating a design layout comprising the plurality of cell clusters; and fabricating the semiconductor device according to the design layout.

17. The method according to claim 16, further comprising generating an image based on the projected light beam and overlaying the image with the design layout to determine the defective region.

18. The method according to claim 13, wherein manufacturing a semiconductor device comprises forming conductive pads, and the method further comprises transmitting a test signal to the semiconductor device through the conductive pads while projecting the light beam onto the defective area.

19. A method, comprising:

transmitting a test signal to a semiconductor device in a semiconductor wafer to determine a defective area on a front side of the semiconductor wafer, the defective area including a first number of transistors;

forming a recess on a backside of the semiconductor wafer and aligned with the defective area;

projecting a light beam onto the defective area from the backside through the recess to determine a defective region located within the defective area, the defective region including a second number, less than the first number, of transistors; and inspecting the second number of transistors.

20. The method according to claim 19, wherein the defective region is a well region or a doped region in the semiconductor device.

* * * * *